United States Patent [19]
Lehle et al.

[11] Patent Number: 6,042,496
[45] Date of Patent: *Mar. 28, 2000

[54] HYDROSTATIC-MECHANICAL POWER DISTRIBUTION TRANSMISSION

[75] Inventors: Hubert Lehle, Meckenbeuren; Jürgen Pohlenz, Ravensburg, both of Germany

[73] Assignee: ZF Friedrichshafen AG, Friedrichshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,605

[22] PCT Filed: Jun. 15, 1996

[86] PCT No.: PCT/EP96/02590

§ 371 Date: Nov. 18, 1997

§ 102(e) Date: Nov. 18, 1997

[87] PCT Pub. No.: WO97/01049

PCT Pub. Date: Jan. 9, 1997

[30] Foreign Application Priority Data

Jun. 23, 1995 [DE] Germany ............. 195 22 833

[51] Int. Cl.[7] .................................................. F16H 47/04
[52] U.S. Cl. ................................................ 475/81; 475/72
[58] Field of Search ................ 475/72, 74, 78, 475/79, 80, 81, 82, 207, 218, 219, 302; 74/606 R

[56] References Cited

U.S. PATENT DOCUMENTS

| | | | |
|---|---|---|---|
| 3,736,813 | 6/1973 | Kress et al. | 475/82 |
| 3,777,593 | 12/1973 | Mooney, Jr. et al. | 475/81 |
| 3,810,519 | 5/1974 | Galos et al. | 74/606 R X |
| 3,944,010 | 3/1976 | Winter et al. | 74/606 R X |
| 3,990,327 | 11/1976 | Margolin | 475/80 |
| 4,134,310 | 1/1979 | Orshansky, Jr. et al. | 475/80 X |
| 4,258,585 | 3/1981 | Orshansky, Jr. et al. | 475/24 |
| 4,286,477 | 9/1981 | Meyerle et al. | 475/81 X |
| 4,304,151 | 12/1981 | Meyerle et al. | 475/81 X |
| 4,397,201 | 8/1983 | Mann | 475/83 |
| 4,856,368 | 8/1989 | Fujisaki et al. | 74/606 R |
| 5,125,291 | 6/1992 | Makita et al. | 74/606 R X |
| 5,129,867 | 7/1992 | Fredriksen et al. | 475/74 X |
| 5,142,940 | 9/1992 | Hasegawa | 74/606 R |
| 5,159,855 | 11/1992 | Nikolaus et al. | 475/78 X |
| 5,248,283 | 9/1993 | Eckhardt et al. | 475/72 |
| 5,328,418 | 7/1994 | Meyerle | 475/81 |
| 5,667,452 | 9/1997 | Coutant | 475/80 X |
| 5,683,322 | 11/1997 | Meyerle | 475/81 X |
| 5,695,422 | 12/1997 | Otten | 475/72 |
| 5,785,623 | 7/1998 | Iino et al. | 475/82 X |
| 5,803,856 | 9/1998 | Iino et al. | 475/82 X |

FOREIGN PATENT DOCUMENTS

| | | |
|---|---|---|
| 0 059 055 A3 | 9/1982 | European Pat. Off. . |
| 0 513 674 A1 | 11/1993 | European Pat. Off. . |
| 2 412 761 | 7/1979 | France . |
| 40 21 686 | 1/1991 | Germany . |
| 42 43 018 A1 | 6/1994 | Germany . |
| 2 058 254 | 4/1981 | United Kingdom . |
| 2 261 039 | 5/1993 | United Kingdom ................. 475/72 |

*Primary Examiner*—Dirk Wright
*Attorney, Agent, or Firm*—Davis and Bujold

[57] ABSTRACT

A power distribution transmission is provided with one mechanical and one hydrostatic power branch mounted in a transmission housing (46) driven via a common drive shaft (1) and accumulated in a coupling gear (5). The coupling gear (5), with its several planet gear sets (9, 10, 22, 41) and couplings (27, 32, 35, 39), is connected to an output shaft (53). The coupling gear (5) is mounted on the drive shaft (1). The last planet gear set (41) of the coupling gear (5) can be connected to forward and reverse couplings ($K_v$ and $K_r$, respectively) and the couplings $K_v$ and $K_r$ can be connected to the output shaft (53).

13 Claims, 1 Drawing Sheet

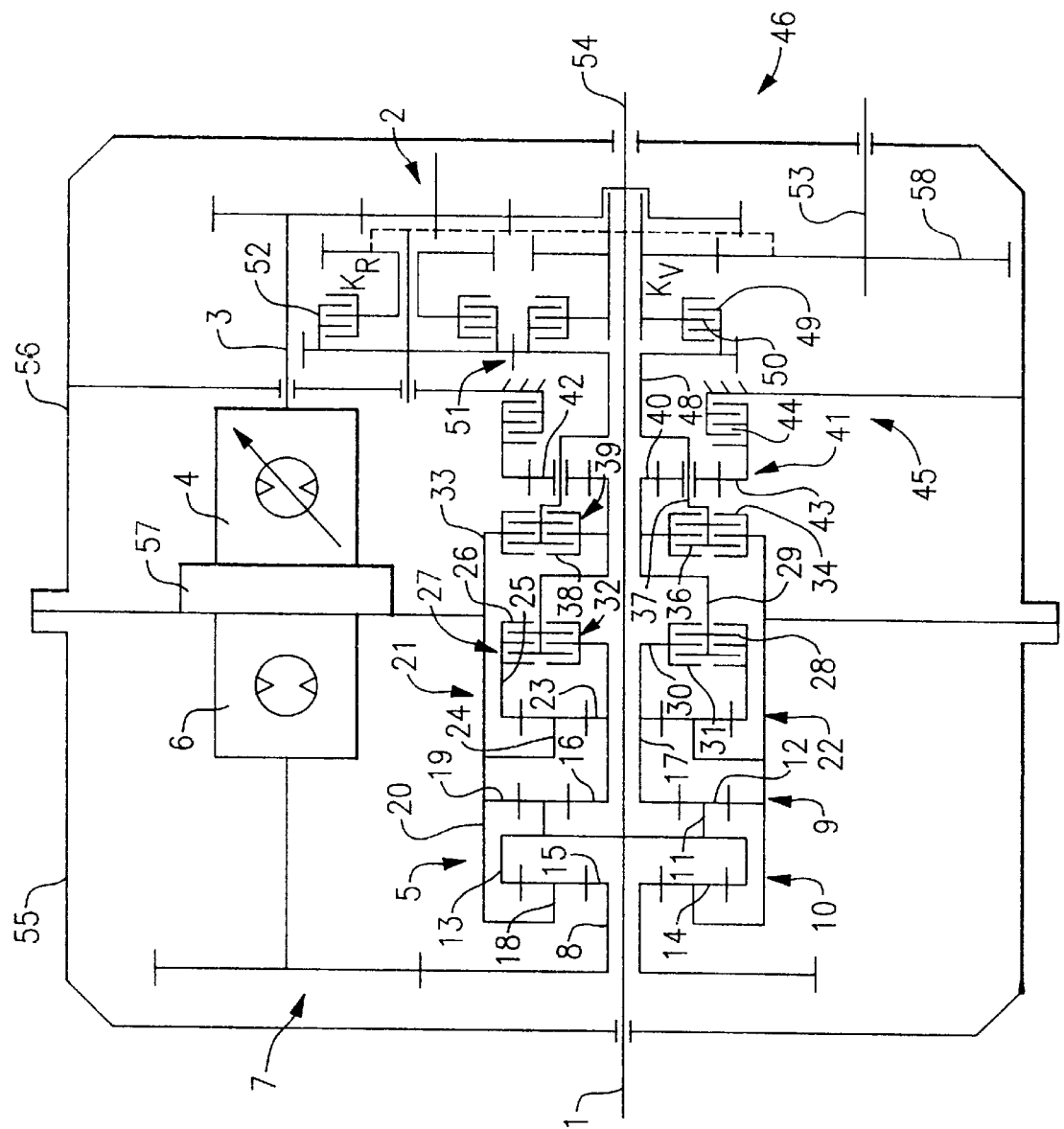

HYDROSTATIC-MECHANICAL POWER DISTRIBUTION TRANSMISSION

The invention concerns a power distribution transmission having mechanical and hydrostatic power branches, mounted in a transmission housing.

A power distribution transmission according to the preamble is known from DE-OS 42 43 018.

However, the hydrostatic-mechanical power distribution transmission disclosed in said publication has the disadvantage that due to it requiring a relatively large space with three wave trains, installation problems result particularly in vehicles used in agriculture such as farm and field tractors. This especially concerns the arrangement of the drum selector gear which is mounted upon a second shaft situated parallel to the input shaft.

Another disadvantage of the known power distribution transmission is a preset center distance between the drive shaft and the output shaft which results from the diameter of the coupling gear or of the drum selector gear so that said distance is specified to the manufacturer and cannot be changed.

In addition, with the power distribution transmission known from the cited publication, only four gearshift ranges for forward travel and two gearshift ranges for reverse travel can be obtained, that is, it is not possible to drive in reverse as quickly as forward and also the traction and the pressure forces obtainable during forward and reverse travel are of different strength which constitutes a considerable disadvantage, especially in vehicles used in agriculture.

This invention, therefore, is based on the problem of providing a power distribution transmission having one mechanical and hydrostatic power branch which, compared to the prior art, has a small installation dimension and thus requires less space within the vehicle and which allows equal forward and reverse traveling speeds.

According to the invention, this problem is solved by the fact that the coupling gear is situated upon the drive shaft and that the last planet gear set of the coupling gear can be connected with couplings $K_v$ for forward travel and $K_r$ for reverse travel, the couplings $K_v$ and $K_r$ being connectable with the output shaft.

By means of the described arrangement, it is possible from the three parallel shafts, namely, the drive shaft, the shaft for a hydrostatic unit and a constant unit, and an input shaft for the planet gear sets of the drum selector gear, which are known from the prior art, to spare one shaft by merging the input shaft and the drive shaft so that an adequately small size results for the power distribution transmission, according to the invention, and besides the distance from the drive shaft to the output shaft can be freely selected and, therefore, the power distribution transmission, according to the invention, can be installed in different types of vehicles.

At the same time, it is possible, with the described arrangement according to the invention, to obtain the same number of gearshift ranges for forward and reverse travel whereby another disadvantage of the transmission of the prior art is overcome which-as already mentioned-made available a different number of gearshift ranges for forward and reverse travel. In the power distribution transmission, according to the invention, the engine speed, therefore, can be adjusted in the forward and the reverse travel, respectively, to the same value optimal for consumption so as to obtain a specific travel speed and output power with the power distribution transmission according to the invention.

Another advantage of the arrangement, according to the invention, is the sparing of gearwheels, since a direct actuation of the drive shaft and thus also of the coupling gear is possible, for example, by a power engine.

In an advantageous development of the invention, holes can be provided in the drive shaft for supplying pressurized oil to the couplings and for supplying lube oil to the coupling gear.

By providing holes in the drive shaft, it is easily possible to supply pressurized oil to the couplings and lube oil for the coupling gear so that no additional expensive devices are needed for supplying said means and thereby the construction of the power distribution transmission, according to the invention, is substantially simplified.

By virtue of the arrangement, according to the invention of the coupling gear, a two-part housing can be provided which has a front housing part facing the input side of the drive shaft and a rear housing part whereby the total construction of the power distribution transmission, according to the invention, and the assembly and maintenance thereof are substantially simplified.

Advantageous designs and developments of the invention result from the subclaims and the embodiment described herebelow with reference to the drawing.

FIG. 1 diagrammatically shows the design of an embodiment of a power distribution transmission according to the invention.

One drive shaft 1 actuates an adjustable hydrostat adjustment unit 4, via a countershaft 2, and a floatingly mounted and, therefore, axial-play compensating connecting shaft 3. In addition, the drive shaft 1 actuates a multi-wave coupling gear 5 (drum selector gear). The multi-wave coupling gear 5 is situated directly upon the drive shaft 1. The hydrostat adjustment unit 4 interacts with a constant hydrostat unit 6. The constant hydrostat unit 6 actuates a second input shaft 8 of the coupling gear 5 via a countershaft 7. The coupling gear 5 contains two three-wave planet gear sets 9, 10. The drive shaft 1 is connected with a planet carrier 11 of the planet gear set 9. The planet gear set 9 contains planet gears 12. The drive shaft 1 is firmly connected with a ring gear 13 of the second planet gear set 10. The second planet gear set 10 contains planet gears 14. The second input shaft 8 is firmly connected with a sun gear 15 of the second planet gear set 10. A sun gear 16 of the first planet gear set 9 is fastened upon a coupling shaft 17. A planet gear carrier 18, of the second planet gear set 10, is connected with a ring gear 19 of the planet gear set 9 and a coupling shaft 20. The coupling shafts 17 and 20 are connected with a second coupling gear 21 which has a planet gear set 22. A sun gear 23 of the planet gear set 22 is connected with the sun gear 16 of the first planet gear set 9 and the planet gear carrier 18 of the second planet gear set 10 is connected with a planet gear carrier 24 of the planet gear set 22 by the coupling shaft 20.

Outer discs 26 of a coupling 27 are non-rotatably mounted on a ring gear 25 of the planet gear set 22. The outer discs 26 engage between discs 28 which are non-rotatably mounted upon a shaft 29.

Upon the coupling shaft 17 is mounted a carrier 30 which, via non-rotatable inner disc 31, meshes between discs 28 of a coupling 32 which are non-rotatably mounted upon the shaft 29.

Outer discs 34 of a coupling 35 are non-rotatably mounted on an intermediate shaft 33 connected with the coupling shaft 20. The outer discs 34 grip in between discs 36 which are non-rotatably mounted upon a shaft 37. The coupling and intermediate shafts 20, 33 are made as a one piece part.

The shaft 29 contains non-rotatably inner discs 38 which grip in between the discs 36 of a coupling 39.

The shaft 29 is firmly connected with a sun gear 40 of a fourth planet gear set 41. The fourth planet gear set 41 has planet gears 42. A ring gear 43 of the fourth planet gear set 41 can be connected with a transmission housing 46 by a multi-disc brake 45.

The shaft 37 carries the planet gears 42 of the fourth planet gear set 41 and is connected with a shaft 48. Outer discs 49 with inner discs 50 form a coupling $K_v$ for forward travel. The outer discs of the coupling $K_v$ are non-rotatably connected with the shaft 48.

The shaft 48 is further connected by a reversing gear 51 with outer discs 52 of a coupling $K_r$. Both couplings $K_r$ and $K_v$ can transmit the respective torque to an output shaft 53, a power take-off clutch, not shown, is situated on the output-side of the power distribution transmission, upon the drive shaft 1, by which a power take-off shaft 54 is driven.

For reasons of drawing technique, the clutch $K_r$ is shown situated relatively far removed from the output shaft 53. In practice, the coupling $K_r$ is situated exactly like the coupling $K_v$ next to the drive shaft 1 and, as indicated by the dotted line in the figure, operatively connected with a gearwheel 58 provided upon the output shaft 53.

The transmission housing 46 is designed with two parts and has a front housing part 55 facing the input side of the drive shaft 1 and a rear housing part 56.

On the front housing part 55, a plate 57 is situated on which is mounted the hydrostat adjustment unit 4 and the constant hydrostat unit 6 on an end face. Said units can be fastened over silent blocks. The blocks can be centrally lubricated.

The drive shaft 1, upon which is situated the coupling gear 5, carries and centers, according to the above described arrangement, the four planet gear sets 9, 10, 22 and 41 of the drum selector gear.

In order to make the supply of pressurized oil to the couplings 27, 32, 35, 39 possible, adequate holes are provided in the drive shaft 1 extending in the longitudinal direction of the drive shaft 1, lube oil being supplied to the coupling gear 5 via another hole in the drive shaft 1.

The power take-off shaft 54 can be driven directly by the drive shaft 1 via a power take-off coupling, not shown. Besides, a gearwheel of the countershaft 2 for the hydrostatic power branch is mounted on the drive shaft 1.

Now herebelow operation of the power distribution transmission shown in the figure is described.

The hydrostat adjustment unit 4 is actuated by the drive shaft 1 proportionally to the speed of a power engine such as an internal combustion engine. The constant hydrostat unit 6 is accelerated by adjusting the flow rate of the hydrostat adjustment unit 4 and the ring gear 25 of the planet gear set 22 is brought to zero speed by adding up the speeds of the drive shaft 1 and of the second input shaft 8 in the coupling gears 5 and 21. If the a zero speed of the ring gear 25 is reached, the coupling 27 closes. The sum of the power from the hydrostatic and the mechanical branches, that is, the sum of the power transmitted via the drive shaft 1 and the second input shaft 8, flows via the sun gear 16, the planet gear carrier 18, the coupling shafts 17, 20 and the ring gear 25 of the planet gear set 22, the same as the coupling 27, to the sun gear 40 of the fourth planet gear set 41. The multi-disc brake 45 is engaged so that the ring gear 43 of the fourth planet gear set 41 stops. Power thus flows, via one of the couplings $K_v$ or $K_r$, to the output shaft 53.

The further conversion of the reduction ratio of the power distribution transmission shown is obtained by another adjustment of the hydrostat adjustment unit 4. If, after passing the first travel range of the power distribution transmission, the ring gear 25 arrives at a synchronous speed with the speed of the carrier 30, the coupling 32 closes and the coupling 27 opens. The accumulated power then flows, via the sun gear 16 of the planet gear set 9, the coupling shaft 17 and the closed coupling 32. In this travel range, the power further flows via the sun gear 40 of the fourth planet gear set 41 and, when the brake 45 is engaged and thus the ring gear 43 is stationary, via $K_v$ or $K_r$ toward the output shaft 54. Contrary to the prior art, the reversal of direction of travel, that is, the selection of forward travel or reverse travel, is not effected in the fourth planet gear set 41 but in the couplings $K_v$ and $K_r$ whereby, in the instant embodiment, four traveling steps, respectively, for forward and reverse travel are available.

To change to the third travel range, the coupling 35 closes during the synchronous speed of the intermediate shaft 33 and the shaft 37 and then the multi-disc brake 45 immediately disengages. The combined power from the mechanical and the hydrostatic power distribution branches then flows via the coupling shaft 20 and the intermediate shaft 33 over the coupling 35 and when the multi-disc brake 45 is disengaged, via the coupling $K_v$ or $K_r$ to the output shaft 53 of the power distribution transmission.

The fourth traveling range of the power distribution transmission is reached by closing the coupling 39 during a synchronous speed of the coupling 35 and immediately thereafter opening of the coupling 35. The accumulated power from the mechanical and hydrostatic power branches then flows via the sun 16 of the first planet gear set 9, via the coupling 32 and the coupling 39 and when the multi-disc brake 45 is disengaged, to the output shaft 53 of transmission.

According to which coupling $K_v$ or $K_r$ is open, it is possible in the four traveling ranges or steps described to select the travel direction, that is, forward or reverse travel.

It should also be mentioned that when stopped, that is, when reaching the zero speed, both couplings $K_v$ and $K_r$ are closed and the coupling 27 simultaneously becomes open. The whole output train is here locked, that is, the adjustable hydrostat unit 4 is force free and the vehicle, in which the power distribution transmission described is installed, stays steady even without actuation of the operating brake or parking brake and cannot abnormally roll away. In selecting the desired direction of travel, for example, for forward travel, the coupling needed at the time for the opposite direction of travel is opened, that is, during forward travel the coupling $K_r$ is opened while the coupling $K_v$ remains closed and the coupling 27 simultaneously closes again.

With the power distribution transmission described, the vehicle can be reversed, at low speeds, by the couplings $K_v$ and $K_r$. This means, for example, that the coupling $K_r$ has been already closed by pressure modulation when the vehicle still moves forward. Starting from a specific modulation pressure, the hitherto closed coupling $K_v$ opens and the forward moving vehicle is braked by the coupling $K_r$ until stopped and subsequently accelerated in the reverse travel direction. The actually adjusted transmission ratio remains constant during the reversal operation. It will not change again until after the reversal by the couplings $K_v/K_r$ is terminated. Thereby quick reversing operations, without an interruption in the traction force, can be obtained with good operating comfort.

| Reference numerals |
| --- |
| 1 drive shaft |
| 2 countershaft |
| 3 connecting shaft |
| 4 hydrostat adjustment unit |
| 5 coupling gear |
| 6 hydrostat constant unit |
| 7 countershaft |
| 8 second input shaft |
| 9 planet gear set |
| 10 planet gear set |
| 11 planet carrier |
| 12 planet gear |
| 13 ring gear |
| 14 planet gear |
| 15 sun gear |
| 16 sun gear |
| 17 coupling shaft |
| 18 planet gear carrier |
| 19 ring gear |
| 20 coupling shaft |
| 21 second coupling gear |
| 22 planet gear set |
| 23 sun gear |
| 24 planet gear carrier |
| 25 ring gear |
| 26 outer discs |
| 27 coupling |
| 28 discs |
| 29 shaft |
| 30 carrier |
| 31 inner discs |
| 32 coupling |
| 33 interuediate shaft |
| 34 outer discs |
| 35 coupling |
| 36 discs |
| 37 shaft |
| 38 inner discs |
| 39 coupling |
| 40 sun gear |
| 41 fourth planet gear set |
| 42 planet gear |
| 43 ring gear |
| 44 discs |
| 44 multi-disc brake |
| 47 — |
| 48 shaft |
| 49 outer discs |
| 50 inner discs |
| 51 reversing gear |
| 52 outer discs |
| 53 output shaft |
| 54 power take-off |
| 55 front housing part |
| 56 rear housing part |
| 57 plate |
| 58 gearwheel |

We claim:

1. A hydrostatic-mechanical power distribution transmission having a mechanical power branch and a hydrostatic power branch, said transmission comprising:

a transmission housing (46) having an input drive shaft (1), rotating about a drive rotational axis, for supplying input driving power to the transmission;

both the mechanical power branch and the hydrostatic power branch being mounted within said transmission housing (46) and driven by gear coupled to the input drive shaft (1), and the mechanical power branch and the hydrostatic power branch both being accumulated with one another by a coupling gear (5) to provide an output drive for said transmission;

said coupling gear (5) having at least three planetary gear sets (9, 10, 22, 41) and a plurality of coupling elements (27, 32, 35, 39) which are operatively connectable to generate the output drive of said transmission via an output shaft (53) which rotates about an output rotational axis;

the rotational axis of the input drive shaft (1) and the rotational axis of the output shaft (53) being offset with respect to one another; and an output component of said coupling gear (5) being selectively connectable with one of a forward coupling (Kv) and a reverse coupling (Kr);

wherein said coupling gear is mounted concentric with respect to said input drive shaft (1);

said transmission has four output travel ranges and engagement of at least one of said coupling elements (27, 32, 35, 39) of said coupling gear (5) provides at least one of the four output travel ranges;

each of said four output travel ranges is engageable in both a forward travel direction, via engagement of the forward coupling (Kv), and a reverse travel direction, via engagement of the reverse coupling (Kr);

for each one of said four output travel ranges of said transmission a generated torque for the forward travel direction is identical to a generated torque for the reverse travel direction.

2. The power distribution transmission according to claim 1, wherein said coupling gear (5) comprises a first coupling (27), a second coupling (32), a third coupling (35) and a fourth coupling (39), the first coupling (27) and the second coupling (32) are arranged adjacent one another to provide an output drive to a first common component of the fourth coupling (39) such that when said first coupling (27) is engaged with the first common component, said second coupling (32) is disengaged from the first common component, and when said second coupling (32) is engaged with the first common component, said first coupling (27) is disengaged from the first common component; and said fourth coupling (39) and said third coupling (35) are arranged adjacent one another to provide an output drive to a second common component of the fourth coupling (39) such that when said fourth coupling (35) is engaged with the second common component, said third coupling (35) is disengaged from the second common component, and when said third coupling (35) is engaged with the second common component, said fourth coupling (39) is disengaged from the second common component.

3. The power distribution transmission according to claim 1, wherein a power take-off shaft (54) is connected to the transmission and the power take-off shaft (54) is aligned with and directly rotatable by said input drive shaft (1).

4. The power distribution transmission according to claim 1, wherein said transmission housing (46) comprises a front housing part (55) which faces an input side of said drive shaft (1) and a rear housing part (56) which faces an output side of said output shaft (53).

5. The power distribution transmission according to claim 4, wherein said front housing part (55) is connected to a plate which supports both said mechanical power branch and said hydrostatic power branch.

6. The power distribution transmission according to claim 1, wherein said plurality of planetary gear sets (9, 10, 22, 41) are arranged sequentially in series, and the forward coupling (Kv) and the reverse coupling (Kr) are both driven by a common output component of a last one of the series of said planetary gear sets (41).

7. The power distribution transmission according to claim 1, wherein there are four planetary gear sets (9, 10, 22, 41)

and four coupling elements (27, 32, 35, 39) for providing said four output travel ranges of said transmission; and a single output gear of said coupling gear (5) is operably connectable with both said forward coupling (Kv) and said reverse coupling (Kr).

8. The power distribution transmission according to claim 1, wherein the hydrostatic power branch comprises the hydrostat adjustment unit (4), for receiving a driving input from the input drive shaft (1), and a constant hydrostat unit (6), coupled to the hydrostat adjustment unit (4) to receive driving power therefrom, and the constant hydrostat unit (6) provides an output drive which is supplied as the input to said coupling gear (5).

9. The power distribution transmission according to claim 1, wherein the hydrostatic power branch comprises the hydrostat adjustment unit (4), for receiving a driving input from the input drive shaft, and a constant hydrostat unit (6), coupled to the hydrostat adjustment unit (4) to receive driving power therefrom, and the constant hydrostat unit (6) provides an output drive to said coupling gear (5); and a plate (57) is connected to said front housing (55), and the plate supports both the hydrostat adjustment unit (4) and the constant hydrostat unit (6) with the hydrostat adjustment unit (4) located on one side of the plate (57) and the constant hydrostat unit (6) is located on the other side of the plate (57).

10. The power distribution transmission according to claim 1, wherein the hydrostatic power branch is driven by a shaft (3) which is offset with respect to the input drive shaft (1) and the hydrostatic power branch shaft rotates in the same rotational direction as the input drive shaft (1).

11. A hydrostatic-mechanical power distribution transmission having a mechanical power branch and a hydrostatic power branch, said transmission comprising:

a transmission housing (46) having an input drive shaft (1), rotating about a drive rotational axis, for supplying input driving power to the transmission;

both the mechanical power branch and the hydrostatic power branch being mounted within said transmission housing (46) and driven by gear coupled to the input drive shaft (1), and the mechanical power branch and the hydrostatic power branch both being accumulated with one another by a coupling gear (5) to provide an output drive for said transmission;

said coupling gear (5) having at least three planetary gear sets (9, 10, 22, 41) and a plurality of coupling elements (27, 32, 35, 39) which are operatively connectable to generate the output drive of said transmission via an output shaft (53) which rotates about an output rotational axis;

the rotational axis of the input drive shaft (1) and the rotational axis of the output shaft (53) being offset with respect to one another; and an output component of said coupling gear (5) being selectively connectable with one of a forward coupling (Kv) and a reverse coupling (Kr);

wherein said coupling gear is mounted concentric with respect to said input drive shaft (1);

said transmission has four output travel ranges and engagement of at least one of said coupling elements (27, 32, 35, 39) of said coupling gear (5) provides at least one of the four output travel ranges;

each of said four output travel ranges is engageable in both a forward travel direction, via engagement of the forward coupling (Kv), and a reverse travel direction, via engagement of the reverse coupling (Kr);

for each one of said four output travel ranges of said transmission a generated torque for the forward travel direction is identical to a generated torque for the reverse travel direction; and the output component of said coupling gear is a gear which rotates during engagement of the forward coupling (Kv) and also rotates during engagement of the reverse coupling (Kr).

12. A hydrostatic-mechanical power distribution transmission having a mechanical power branch and a hydrostatic power branch, said transmission comprising:

a transmission housing (46) having an input drive shaft (1), rotating about a drive rotational axis, for supplying input driving power to the transmission;

both the mechanical power branch and the hydrostatic power branch being mounted within said transmission housing (46) and the hydrostatic power branch being driven by gear coupled to the input drive shaft (1), and the mechanical power branch and the hydrostatic power branch both being accumulated with one another by a coupling gear (5) to provide an output drive for said transmission;

said coupling gear (5) having at least three planetary gear sets (9, 10, 22, 41) and a plurality of coupling elements (27, 32, 35, 39) which are operatively connectable to generate the output drive of said transmission via an output shaft (53) which rotates about an output rotational axis;

the rotational axis of the input drive shaft (1) and the rotational axis of the output shaft (53) being offset with respect to one another; and an output component of said coupling gear (5) being selectively connectable with one of a forward coupling (Kv) and a reverse coupling (Kr);

wherein said coupling gear is mounted concentric with respect to said input drive shaft (1);

said transmission has four output travel ranges and engagement of at least one of said coupling elements (27, 32, 35, 39) of said coupling gear (5) provides at least one of the four output travel ranges;

each of said four output travel ranges is engageable in both a forward travel direction, via engagement of the forward coupling (Kv), and a reverse travel direction, via engagement of the reverse coupling (Kr); and for each one of said four output travel ranges of said transmission a generated torque for the forward travel direction is identical to a generated torque for the reverse travel direction;

the output component of said coupling is a gear which rotates during engagement of the forward coupling (Kv) and also rotates during engagement of the reverse coupling (Kr); and coupling members, for the forward coupling (Kv), and coupling members, for the reverse coupling (Kr), are both located axially between the output component of said coupling gear (5) and the gear coupled to the input drive shaft (1) for supplying driving power to the hydrostatic power branch.

13. The power distribution transmission according to claim 12, wherein the coupling members for the forward coupling (Kv) are concentric with and supported by the input drive shaft (1), and the coupling members for the reverse coupling (Kr) are supported by a shaft offset with respect to input drive shaft (1).

* * * * *